US011440606B2

(12) United States Patent
Hirose et al.

(10) Patent No.: US 11,440,606 B2
(45) Date of Patent: Sep. 13, 2022

(54) STRADDLE-TYPE ELECTRIC VEHICLE

(71) Applicant: HONDA MOTOR CO., LTD., Tokyo (JP)

(72) Inventors: Yudai Hirose, Wako (JP); Naoya Ishimatsu, Wako (JP); Hiroshi Tamura, Wako (JP); Ryo Kubota, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 203 days.

(21) Appl. No.: 17/013,007

(22) Filed: Sep. 4, 2020

(65) Prior Publication Data

US 2020/0398922 A1 Dec. 24, 2020

Related U.S. Application Data

(63) Continuation of application No. PCT/JP2018/013419, filed on Mar. 29, 2018.

(51) Int. Cl.
*B62J 41/00* (2020.01)
*B62J 43/16* (2020.01)
(Continued)

(52) U.S. Cl.
CPC ............ *B62J 41/00* (2020.02); *B62J 43/16* (2020.02); *B62K 11/04* (2013.01); *B62M 7/02* (2013.01);
(Continued)

(58) Field of Classification Search
CPC ...................................................... B62J 41/00
(Continued)

(56) References Cited

U.S. PATENT DOCUMENTS 5,715,904 A 2/1998 Takahashi et al.
8,783,405 B2 7/2014 Irie et al.
(Continued)

FOREIGN PATENT DOCUMENTS

EP 2910459 A1 * 8/2015 ............ B62J 17/02
JP S56-17768 A 2/1981
(Continued)

OTHER PUBLICATIONS

International Search Report for PCT/JP2018/013419 dated Jul. 3, 2018.
IPRP for PCT/JP2018/013419 dated Apr. 6, 2020.

*Primary Examiner* — Kevin Hurley
*Assistant Examiner* — Hosam Shabara
(74) *Attorney, Agent, or Firm* — Thomas | Horstemeyer, LLP

(57) ABSTRACT

A straddle-type electric vehicle including a main frame extending in a longitudinal direction of a vehicle body, a pivot frame extending downward from a rear portion of the main frame, and a swing arm which is supported by the pivot frame and by which a rear wheel is swingably supported, the straddle-type electric vehicle, further comprising a battery supported by the main frame, a motor unit configured to be coolable by circulation of a cooling medium, a control apparatus that controls the motor unit based on electric power of the battery, and a heat exchanger connected to the motor unit via a pipe that forms a flow path for the cooling
(Continued)

medium, wherein the control apparatus and the heat exchanger are arranged anterior to the battery in alignment with each other.

16 Claims, 6 Drawing Sheets

(51) Int. Cl.
    *B62M 7/02*     (2006.01)
    *H02K 9/193*     (2006.01)
    *B62K 11/04*     (2006.01)
    *H02K 11/33*     (2016.01)
    *H02K 11/00*     (2016.01)
    *B62K 25/28*     (2006.01)

(52) U.S. Cl.
    CPC .......... *H02K 9/193* (2013.01); *H02K 11/0094* (2013.01); *H02K 11/33* (2016.01); *B62K 25/28* (2013.01); *B62K 2204/00* (2013.01)

(58) Field of Classification Search
    USPC ........................................................ 180/220
    See application file for complete search history.

(56) References Cited

U.S. PATENT DOCUMENTS

| | | | |
|---|---|---|---|
| 9,160,214 | B2 | 10/2015 | Matsuda |
| 9,278,725 | B2 * | 3/2016 | Matsuda ................. B60L 15/20 |
| 9,643,514 | B2 * | 5/2017 | Matsuda ................. B60L 50/51 |
| 10,270,314 | B2 | 4/2019 | Matsuda |
| 2012/0111651 | A1 | 5/2012 | Irie et al. |
| 2013/0270938 | A1 | 10/2013 | Matsuda |
| 2016/0236748 | A1 | 8/2016 | Matsuda |

FOREIGN PATENT DOCUMENTS

| | | |
|---|---|---|
| JP | H08-67281 A | 3/1996 |
| JP | 2008179336 A | 8/2008 |
| JP | 2012101679 A | 5/2012 |
| JP | 2015089701 A | 5/2015 |
| WO | 2012063291 A1 | 5/2012 |
| WO | 2015049711 A1 | 4/2015 |
| WO | 2019186944 A1 | 10/2019 |

* cited by examiner

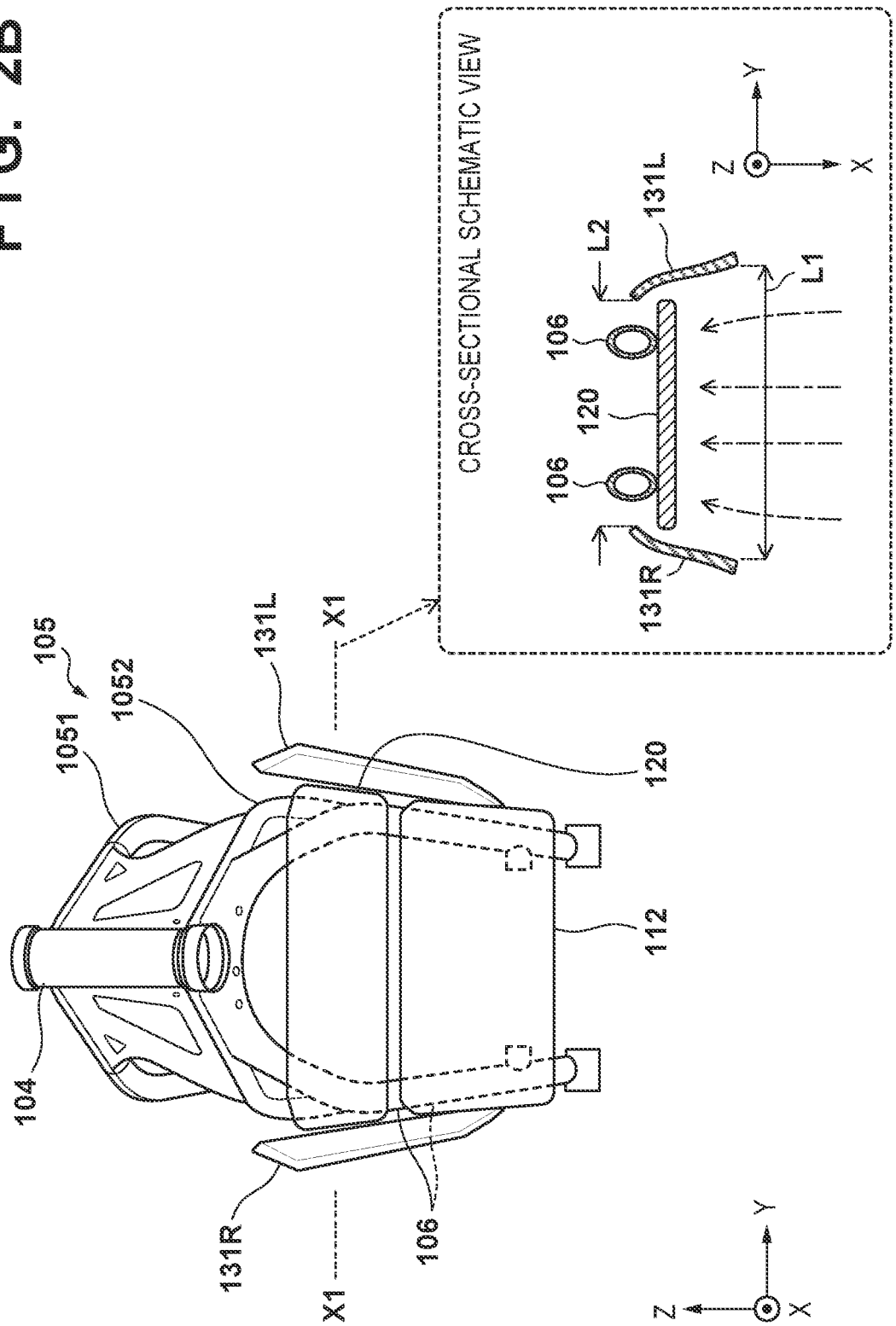

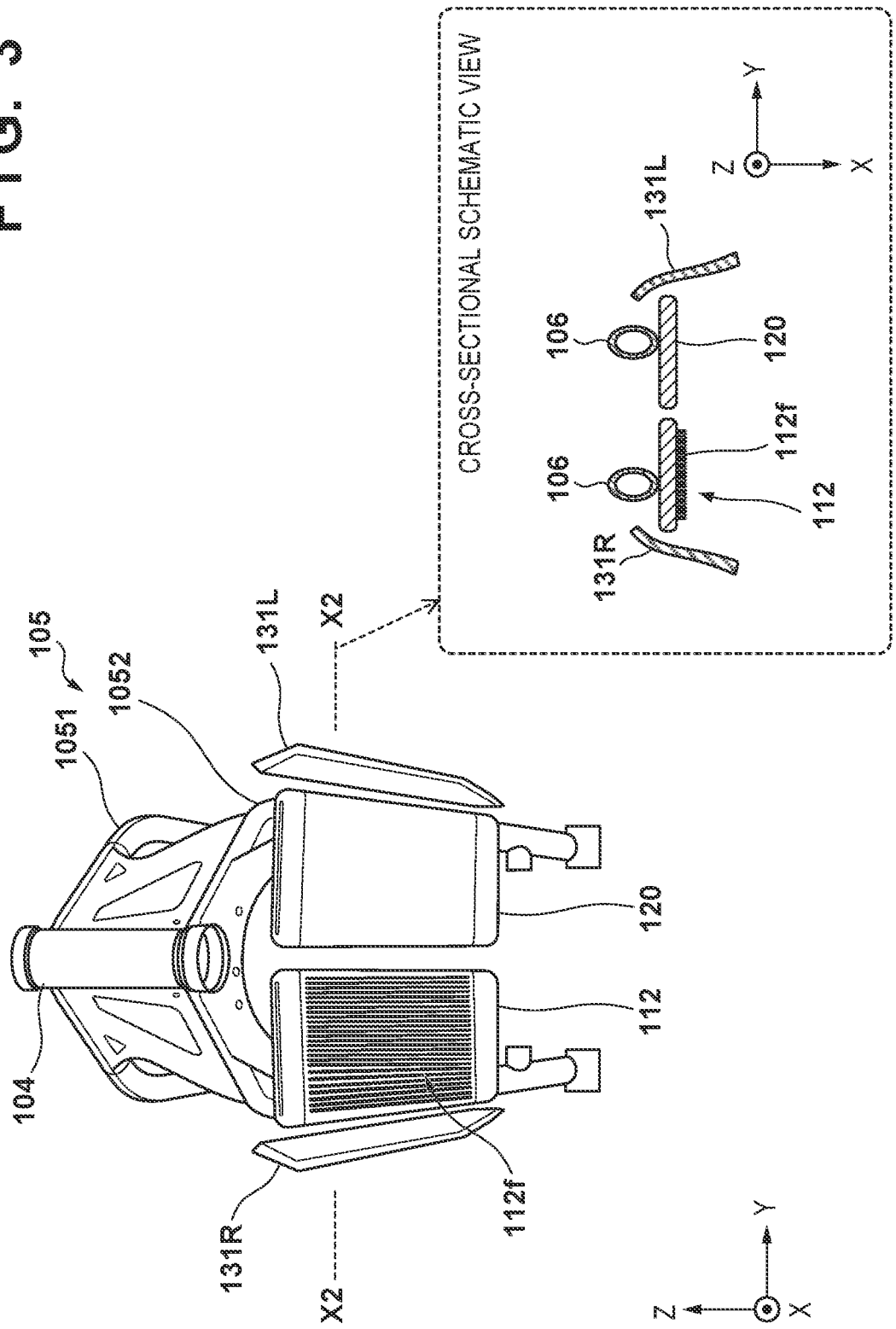

STRADDLE-TYPE ELECTRIC VEHICLE

CROSS-REFERENCE TO RELATED APPLICATION(S)

This application is a continuation of International Patent Application No. PCT/JP2018/013419 filed on Mar. 29, 2018, the entire disclosures of which is incorporated herein by reference.

TECHNICAL FIELD

The present invention relates to a straddle-type electric vehicle.

BACKGROUND ART

PTL 1 describes a configuration of a straddle-type electric vehicle (electric two-wheeled vehicle) that includes a battery, a motor unit, and an inverter unit. The motor unit includes a predetermined motor for driving a driving wheel. The inverter unit converts electric power between the battery and the motor unit; for example, it converts direct-current voltage into alternating-current voltage, and converts alternating-current voltage into direct-current voltage. The inverter unit is also referred to as, for example, a power control unit, or is also generally referred to as a control apparatus.

CITATION LIST

Patent Literature

PTL 1: International Publication No. 2015/049711

SUMMARY OF INVENTION

Technical Problem

According to PTL 1, oil, which is a cooling medium, is cooled by an oil cooler, and the motor unit and the control apparatus (inverter unit) are cooled by circulating this oil. The amount of heat generated by this control apparatus is relatively large, and the generated heat may be equivalent to or greater than the heat of the motor unit, thereby leaving room for structural improvement for increasing the cooling performance.

It is an object of the present invention to enable appropriate cooling of both of a motor unit and a control apparatus in a straddle-type electric vehicle.

Solution to Problem

A first aspect of the present invention relates to a straddle-type electric vehicle, and the straddle-type electric vehicle is a straddle-type electric vehicle including a main frame that is installed so as to extend in a longitudinal direction of a vehicle body, a pivot frame that is installed so as to extend downward from a rear portion of the main frame, and a swing arm which is supported by the pivot frame and by which a rear wheel is swingably supported, the straddle-type electric vehicle, further comprising: a battery supported by the main frame; a motor unit configured to be coolable by circulation of a cooling medium; a control apparatus that controls the motor unit based on electric power of the battery; and a heat exchanger connected to the motor unit via a pipe that forms a flow path for the cooling medium, wherein the control apparatus and the heat exchanger are exposed and arranged anterior to the battery in alignment with each other, such that a traveling wind hits front surfaces of both the control apparatus and the heat exchanger.

Advantageous Effects of Invention

According to the present invention, both of a motor unit and a control apparatus can be cooled appropriately.

BRIEF DESCRIPTION OF DRAWINGS

FIG. 2B is a front view and a cross-sectional schematic view for describing an example of a part of a vehicle body configuration of a straddle-type electric vehicle.

FIG. 3 is a front view and a cross-sectional schematic view for describing an example of a part of a vehicle body configuration of a straddle-type electric vehicle.

DESCRIPTION OF EMBODIMENTS

Figure 1:
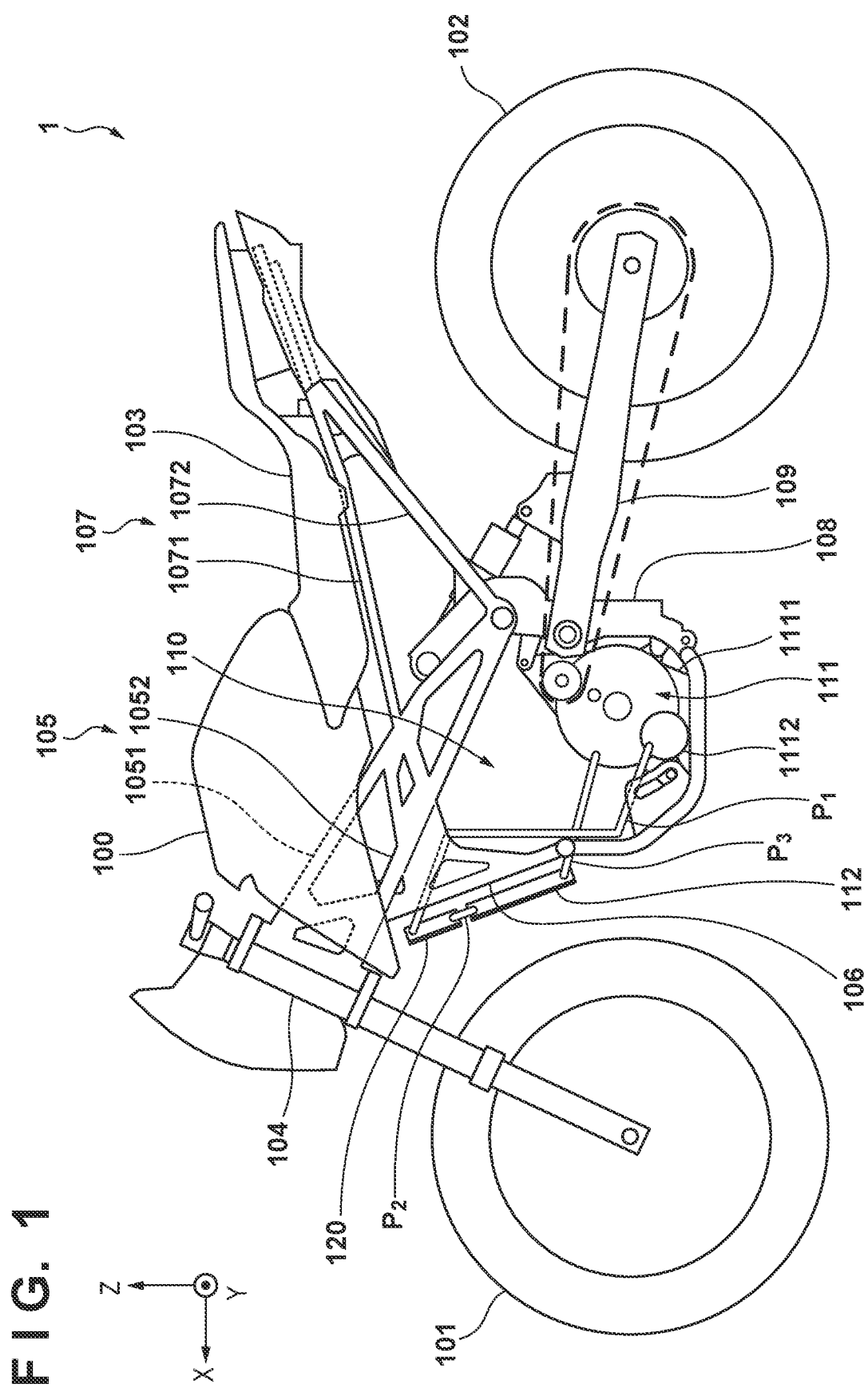
FIG. 1 is a right side view for describing an example of a vehicle body configuration of a straddle-type electric vehicle (electric two-wheeled vehicle).

Hereinafter, embodiments will be described in detail with reference to the attached drawings. Note that each drawing is a schematic diagram that shows a structure or a configuration of an embodiment, and the dimensions of each member shown do not necessarily reflect the actual dimensions. Furthermore, in the attached drawings, the same reference numerals are given to the same or similar elements, and redundant description thereof is omitted.

First Embodiment

FIG. 1 is a right side view showing a configuration of a straddle-type electric vehicle 1 according to a first embodiment. In the figure, in order to facilitate the understanding of the structure, an X-axis, a Y-axis, and a Z-axis that are perpendicular to one another are shown (the same goes for other figures that will be described later). The X direction corresponds to the longitudinal direction of a vehicle body, the Y direction corresponds to the vehicle width direction or the left-and-right direction of the vehicle body, and the Z direction corresponds to the up-and-down direction of the vehicle body. In the present specification, such expressions as front/rear, left/right (side), and up/down indicate relative positional relationships based on the vehicle body. For example, such expressions as "front" and "anterior to" correspond to the +X direction, and such expressions as "rear" and "posterior to" correspond to the −X direction. Similarly, such expressions as the inner side in the vehicle width direction (the inner side of the vehicle)/the outer side in the vehicle width direction (the outer side of the vehicle) also indicate relative positional relationships based on the vehicle body.

In the present embodiment, the straddle-type electric vehicle 1 is a motorcycle that a rider (driver) can ride by straddling a vehicle body 100, and includes a front wheel 101 and a rear wheel 102. A seat 103 on which the rider can be seated is provided on the vehicle body 100. In addition, the straddle-type electric vehicle 1 further includes a head pipe 104, main frames 105, down frames 106, seat rails 107, pivot frames 108, and swing arms 109 within the vehicle body 100. In the present embodiment, the main frames 105, down frames 106, seat rails 107, pivot frames 108, and swing arms 109 are provided as a pair on the left and right; this, however, is not shown because FIG. 1 is the right side view. As another embodiment, the main frame 105, the down frame 106, and the seat rail 107 may each be provided as a single entity (they may not be provided as a pair on the left and right). Note that the foregoing frames 105 to 108 may be collectively referred to as, for example, a vehicle body frame.

The head pipe 104 is arranged at the front of the vehicle body 100 in such a manner that a handle bar is turnably supported thereby, and the rider can perform a steering operation while changing the orientation of the front wheel 101 via a front fork by turning this handle bar.

The pair of left and right main frames 105 is installed so as to extend from the head pipe 104 in the longitudinal direction of the vehicle body while becoming distanced from each other in the left-and-right direction. In the present embodiment, the main frame 105 includes an upper frame portion 1051 and a lower frame portion 1052. In the present embodiment, in order to improve the strength of the main frame 105, a truss frame (reinforcement member) is mounted between the upper frame portion 1051 and the lower frame portion 1052.

In the present embodiment, the down frame 106 is installed so as to extend downward and rearward from a front portion of the lower frame portion 1052. As another embodiment, the down frame 106 may be installed so as to extend downward and rearward from the head pipe 104. The head pipe 104 is installed so as to extend downward and rearward first, and then rearward (until the later-described pivot frames 108), and is capable of holding various types of vehicle constituents within the vehicle body 100.

The seat rail 107 is installed so as to extend rearward from a rear portion of the main frame 105, and supports a load applied to the seat 103. In the present embodiment, the seat rail 107 includes an upper frame portion 1071 and a lower frame portion 1072. Similarly to the main frame 105, in order to improve the strength of the seat rail 107, a truss frame (reinforcement member) may be mounted between the upper frame portion 1071 and the lower frame portion 1072; this, however, is not shown here.

The pivot frame 108 is installed so as to extend downward from a rear portion of the main frame 105, the swing arm 109 is supported by this pivot frame 108, and the rear wheel 102 is swingably supported by the swing arm 109.

The straddle-type electric vehicle 1 further includes a battery 110, a motor unit 111, and a control apparatus 112. As the battery 110, a chargeable secondary battery is used, examples of which include a lithium-ion battery, a nickel-hydrogen battery, and the like. The motor unit 111 generates motive power (rotation) based on the electric power of the battery 110. An electric motor, such as a three-phase induction motor, is used as the motor unit 111. Note that the motor unit 111 may be referred to as, for example, a power unit.

The control apparatus 112 is also referred to as, for example, a PDU (power drive unit) with the inclusion of a function of converting direct-current voltage into alternating-current voltage, or is also referred to as, for example, a PCU (power control unit) with the further inclusion of a function of converting alternating-current voltage into direct-current voltage, a function of converting a voltage level, and the like. For example, the control apparatus 112 controls the motor unit 111 by converting the electric power of the battery 110 into a predetermined type and supplying the converted electric power to the motor unit 111. Furthermore, the control apparatus 112 can also charge the battery 110 using the electric power that has been generated by regenerative braking of the motor unit 111.

The battery 110 is arranged in the space between the pair of left and right main frames 105 in a plan view (from a viewpoint in the −Z direction), and is also arranged so as to overlap the main frames 105 in a side view (from a viewpoint in the ±Y direction). The battery 110 is supported either directly or indirectly with respect to the main frames 105; in the present embodiment, the battery 110 is fixed by a non-illustrated hanger between the pair of left and right main frames 105 around a lower portion of the down frames 106.

The motor unit 111 is arranged in the space between the pair of left and right main frames 105 in a plan view, and is, in the present embodiment, fixed by a predetermined mount unit with respect to the pivot frames 108 around a lower portion of the vehicle body 100. In this way, the motor unit 111 is fixed at a position where it can appropriately transmit motive power to the rear wheel 102, and this motive power is transmitted to the rear wheel 102 via, for example, a chain.

The control apparatus 112 is fixed or installed with respect to the down frames 106, and is, in the present embodiment, arranged anterior to the down frames 106 so as to be hit by traveling wind that is generated during travel of the straddle-type electric vehicle 1. In addition, as the control apparatus 112 is positioned anterior to the battery 110 and is also positioned anterior to and above the power unit 111, a wire unit (wire harness) that is used to supply the electric power of the battery 110 to the power unit 111 can be made relatively short.

Also, the straddle-type electric vehicle 1 further includes a heat exchanger 120. The heat exchanger 120 is fixed with respect to the down frames 106. In the present embodiment, the motor unit 111 is configured to be coolable by a cooling medium circulating therein, and the heat exchanger 120 is connected to the motor unit 111 via a pipe $P_1$ that forms a flow path for the cooling medium. The cooling medium that absorbed heat from the motor unit 111 is cooled by the heat exchange performed in this heat exchanger 120. In the present embodiment, the motor unit 111 is provided with a cooling medium reservoir unit 1111 for reserving the cooling medium, and a pump unit 1112 for circulating the cooling medium. The pump unit 1112 pressure-feeds the aforementioned cooling medium that absorbed heat to the heat exchanger 120 via the pipe $P_1$.

Here, such liquids as water and oil are used as the aforementioned cooling medium. When water is used as the cooling medium (in the case of so-called water cooling), for example, a radiator is used as the heat exchanger 120, a reservoir tank is used as the cooling medium reservoir unit 1111, and a water pump is used as the pump unit 1112. In this case, the pipe $P_1$ is also referred to as, for example, a water jacket. As another example of water cooling, a heat sink and a heat pipe may be used as the heat exchanger 120 and the pipe $P_1$, respectively, and the reservoir unit 1111 and the pump unit 1112 may be omitted. On the other hand, when oil is used as the cooling medium (in the case of so-called oil cooling), for example, an oil cooler is used as the heat exchanger 120, an oil pan is used as the cooling medium reservoir unit 1111, and an oil pump is used as the pump unit 1112. In this case, the pipe $P_1$ is also referred to as, for example, an oil path.

The heat exchanger 120 and the control apparatus 112 are both fixed with respect to the down frames 106, and are arranged anterior to the battery 110 in alignment with each other. The aligned arrangement mentioned here denotes a mode in which two or more elements are arranged in alignment with each other in a predetermined direction. In the present embodiment, the heat exchanger 120 and the control apparatus 112 are arranged in alignment with each other along the direction in which the installed down frames 106 extend, that is to say, are aligned with each other in the up-and-down direction of the vehicle body in a front view (from a viewpoint in the −X direction). In the present embodiment, the control apparatus 112 is arranged below the heat exchanger 120, and the heat exchanger 120 and the control apparatus 112 are connected to each other by a pipe $P_2$. Also, the control apparatus 112 and the motor unit 111 are connected to each other by a pipe $P_3$.

That is to say, the cooling medium that has been pressure-fed by the pump unit 1112 from the motor unit 111 to the heat exchanger 120 via the pipe $P_1$ passes through the heat exchanger 120, then passes through the control apparatus 112 via the pipe $P_2$, and thereafter returns to the motor unit 111 via the pipe $P_3$. In the present embodiment, the foregoing configuration can cool the motor unit 111 and also cool the control apparatus 112.

Figure 2A:
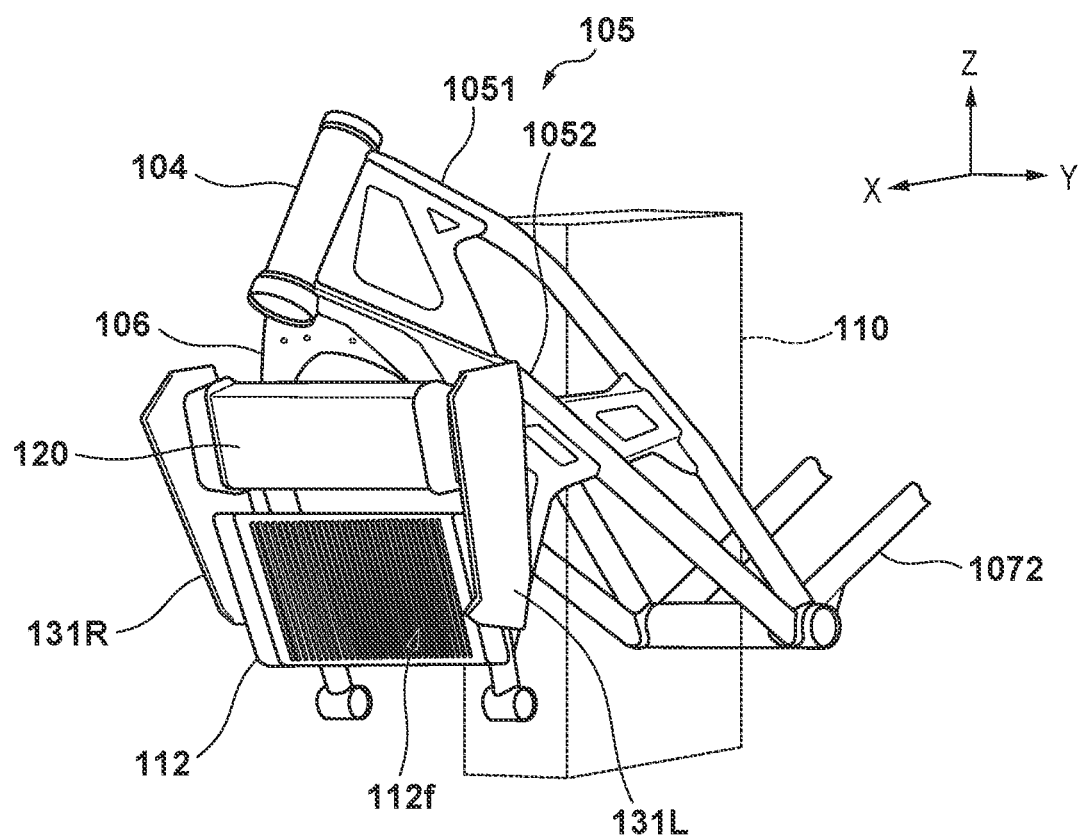
FIG. 2A is a perspective view for describing an example of a part of a vehicle body configuration of a straddle-type electric vehicle.

FIG. 2A is a perspective view showing a part of the configuration of the straddle-type electric vehicle 1. A plurality of heat dissipation fins 112$f$ are installed on a front surface of the control apparatus 112 so as to extend in the up-and-down direction of the vehicle body. In this way, the control apparatus 112 is cooled due to the front surface thereof receiving traveling wind, and traveling wind that has hit the control apparatus 112 flows along each fin 112$f$ toward the lower portion of the vehicle body.

Here, it is sufficient to dispose the control apparatus 112 so that a lower end portion thereof is at least positioned above a lower end portion of the motor unit 111. In this way, the aforementioned traveling wind that has hit the control apparatus 112 and flowed toward the lower portion of the vehicle body can thereafter hit a housing of the motor unit 111, which is below and posterior to the control apparatus 112, and consequently cool the inside thereof.

The straddle-type electric vehicle 1 further includes a pair of left and right shrouds 131L and 131R. The shrouds 131L and 131R are disposed on the outer sides of the pair of left and right down frames 106 in the vehicle width direction, and are arranged on the left and right sides of the control apparatus 112 and the heat exchanger 120 in a front view. Here, each of the shrouds 131L and 131R is installed so as to extend in the up-and-down direction of the vehicle body in such a manner that it overlaps at least both of the control apparatus 112 and the heat exchanger 120 in the horizontal direction of the vehicle body.

FIG. 2B is a front view showing the foregoing part of the configuration of the straddle-type electric vehicle 1. Here, in order to show the shape of the down frames 106, the control apparatus 112 and the heat exchanger 120 are shown only by their outlines. As can be understood from FIG. 2B, the control apparatus 112 and the heat exchanger 120 are both fixed while straddling the pair of left and right down frames 106 in a front view. In this way, each of the control apparatus 112 and the heat exchanger 120 is firmly fixed to the pair of left and right down frames 106. Note that it is sufficient to fix them with use of such fastening members as screws, together with intermediate members or brackets.

FIG. 2B further shows a cross-sectional schematic view taken along the line X1-X1. As indicated by the arrows with the alternating long and short dashed lines in the figure, the pair of left and right shrouds 131L and 131R is fixed so that the orientation thereof guides traveling wind toward the central side of the vehicle body. That is to say, the pair of left and right shrouds 131L and 131R is fixed in such a manner that front edge portions thereof are arranged anterior to the control apparatus 112 and the heat exchanger 120 so as to guide traveling wind to the control apparatus 112 and the heat exchanger 120. In the present embodiment, the pair of left and right shrouds 131L and 131R is fixed in such a manner that a distance L1 therebetween in the front edge portions is longer than a distance L2 therebetween in rear edge portions. In this way, during travel of the straddle-type electric vehicle 1, traveling wind is guided to the control apparatus 112 and the heat exchanger 120.

Here, as stated earlier, each of the shrouds 131L and 131R is installed so as to extend in the up-and-down direction of the vehicle body in such a manner that it overlaps at least both of the control apparatus 112 and the heat exchanger 120 in the horizontal direction of the vehicle body. Therefore, the foregoing structure that guides traveling wind to the control apparatus 112 and the heat exchanger 120 can be realized with a relatively small number of components.

According to the present embodiment, the control apparatus 112 and the heat exchanger 120 are fixed with respect to the down frames 106 in such a manner that they are arranged anterior to the battery 110 in alignment with each other. Therefore, during travel, traveling wind hits both of the control apparatus 112 and the heat exchanger 120. The plurality of heat dissipation fins 112$f$ are installed on the front surface of the control apparatus 112; as a result, the control apparatus 112 is cooled by traveling wind. Meanwhile, the heat exchanger 120 is connected to the motor unit 111 via the pipe $P_1$, and the cooling medium for cooling the motor unit 111 is cooled in the heat exchanger 120 that receives traveling wind; as a result, the motor unit 111 can be cooled appropriately. Therefore, according to the present embodiment, both of the motor unit 111 and the control apparatus 112 can be cooled appropriately.

It is sufficient to arrange the control apparatus 112 and the heat exchanger 120 in alignment with each other such that both of them are appropriately hit by traveling wind, that is to say, such that a section in which they do not overlap each other in a front view is formed, or such that a plane on which one of them is not covered by the other is formed. In the present embodiment, the control apparatus 112 and the heat exchanger 120 are arranged in alignment with each other in the up-and-down direction of the vehicle body in a front view so that they do not overlap each other; thus, both of the motor unit 111 and the control apparatus 112 can be cooled appropriately.

Referring to FIG. 1 again, the cooling medium that has passed through the heat exchanger 120 passes through the control apparatus 112, and then returns to motor unit 111 and cools the motor unit 111. Here, the control apparatus 112 is hit by traveling wind during travel; as the front surface thereof is provided with the heat dissipation fins 112$f$ in the present embodiment, the control apparatus 112 can be cooled sufficiently. Therefore, the cooling medium that has passed through the control apparatus 112 can still have a cooling function. Accordingly, the motor unit 111 can be cooled appropriately by this cooling medium.

Second Embodiment

FIG. 3 shows a front view illustrating a part of a configuration of a straddle-type electric vehicle 1 according to a second embodiment, similarly to FIG. 2B (the first embodiment). The present embodiment differs from the above-described first embodiment mainly in that a control apparatus 112 and a heat exchanger 120 are arranged in alignment with each other in the vehicle width direction. The present embodiment, too, allows traveling wind to appropriately hit both of the control apparatus 112 and the heat exchanger 120, thereby achieving the advantageous effects that are similar to those of the first embodiment.

The present embodiment is advantageous in improving designability when the control apparatus 112 and the heat exchanger 120 are substantially equal in size. In this case, it is sufficient to dispose the control apparatus 112 and the heat exchanger 120 so that they overlap each other in a side view.

In the present embodiment, the control apparatus 112 is fixed with respect to one of a pair of left and right down frames 106, and the heat exchanger 120 is fixed with respect to the other; in this way, each of the control apparatus 112 and the heat exchanger 120 can be fixed appropriately. At this time, the mode of arrangement of a wire unit connected to the control apparatus 112 can be determined on one side of a vehicle body 100, and the mode of arrangement of a pipe $P_1$ and the like connected to the heat exchanger 120 can be determined on the other side of the vehicle body 100. That is to say, according to the present embodiment, the mode of arrangement of the wire unit connected to the control apparatus 112 and the mode of arrangement of the pipe $P_1$ and the like connected to the heat exchanger 120 can be individually determined without making a vehicle body configuration excessively complex; this can be said to be advantageous in terms of design.

Furthermore, as the control apparatus 112 and the heat exchanger 120 generally differ from each other in weight, the present embodiment also makes it possible to balance the center of mass of the vehicle body 100 by determining the positions in which they are arranged in consideration of their weights.

As another example, the mode of arrangement of the control apparatus 112 and the heat exchanger 120 may be determined in consideration of connection relationships with other elements. In one example, the motor unit 111 can be disposed while being displaced from the center of the vehicle body toward one side, for example, the side on which motive power is transmitted to the rear wheel 102 (the side on which a chain for transmitting this motive power is disposed). In this case, it is sufficient to fix the control apparatus 112 with respect to one of the pair of left and right down frames 106 on this side. In this way, a layout that facilitates the supply of the electric power of the battery 110 to the motor unit 111 can be achieved; for example, the wire unit can be made relatively short.

FIG. 3 further shows a cross-sectional schematic view taken along the line X2-X2. In the present embodiment also, a plurality of heat dissipation fins 112$f$ are installed on a front surface of the control apparatus 112 so as to extend in the up-and-down direction of the vehicle body. Accordingly, in the present embodiment also, traveling wind that has hit the control apparatus 112 flows toward a lower portion of the vehicle body. Furthermore, in the present embodiment also, it is sufficient for a lower end portion of the control apparatus 112 to be positioned above a lower end portion of the motor unit 111; in this way, the aforementioned traveling wind that has hit the control apparatus 112 thereafter hits a housing of the motor unit 111. As another embodiment, the plurality of heat dissipation fins 112$f$ may be installed so as to extend in the vehicle width direction in a front view so that traveling wind that has hit the control apparatus 112 is guided to the heat exchanger 120.

Third Embodiment

Figure 4A:
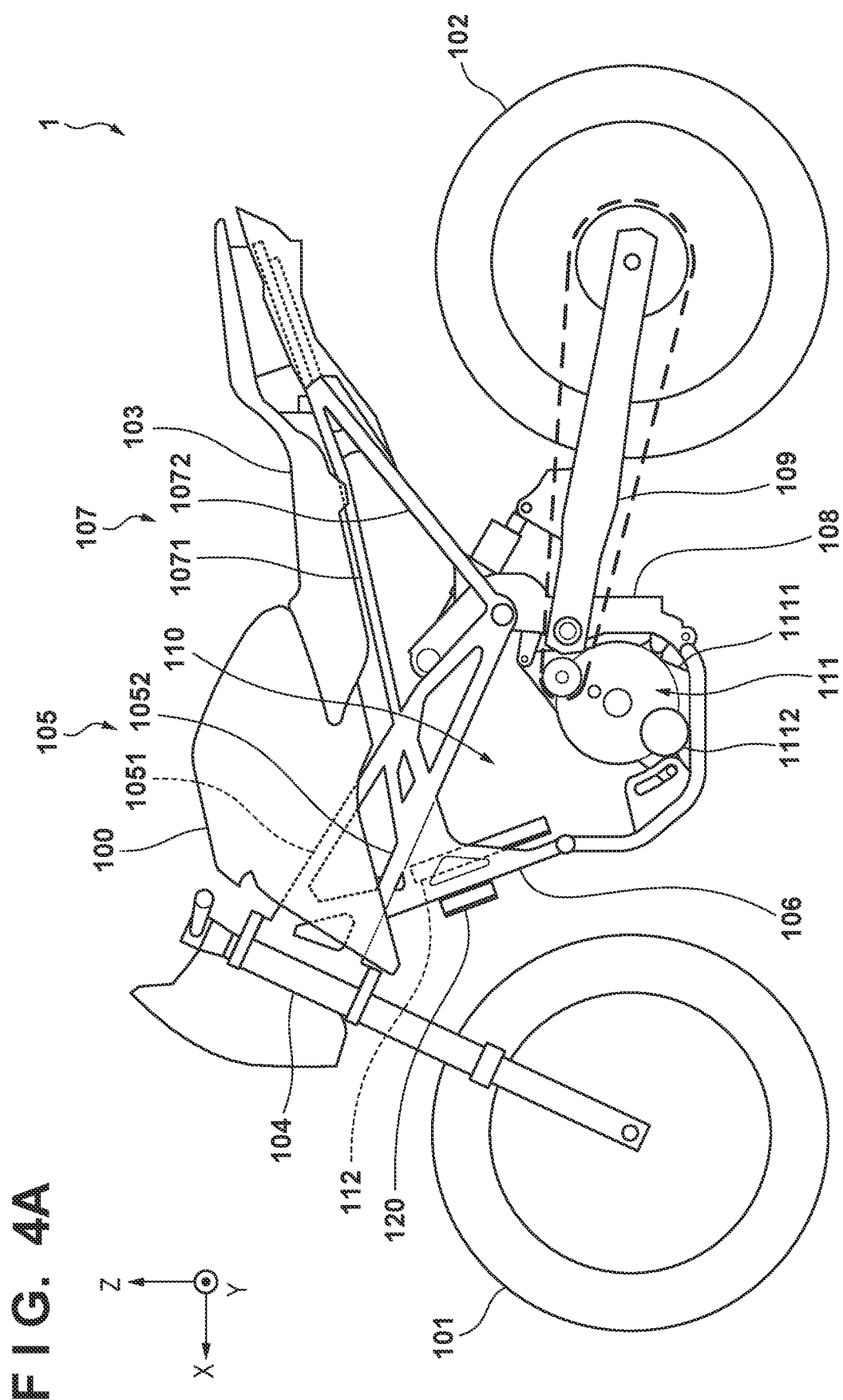
FIG. 4A is a right side view for describing an example of a part of a vehicle body configuration of a straddle-type electric vehicle.
Figure 4B:
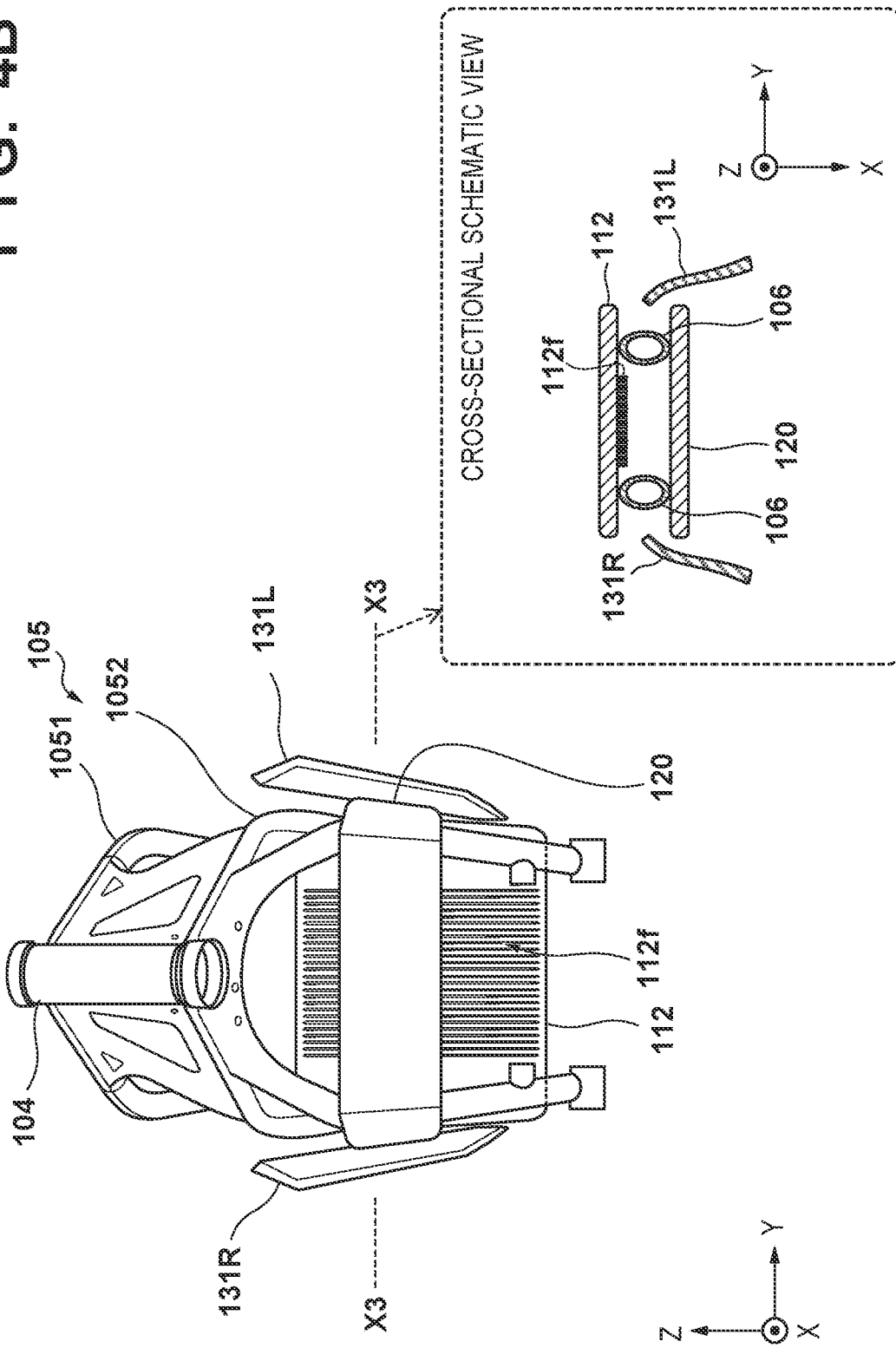
FIG. 4B is a front view and a cross-sectional schematic view for describing an example of a part of a vehicle body configuration of a straddle-type electric vehicle.

FIG. 4A shows a right side view illustrating a configuration of a straddle-type electric vehicle 1 according to a third embodiment, similarly to FIG. 1 (the first embodiment). Here, a pipe $P_1$ and the like are not shown in order to improve the visibility of the figure. FIG. 4B shows a front view illustrating a part of the aforementioned configuration, similarly to FIG. 2B (the first embodiment). The present embodiment differs from the above-described first embodiment mainly in that a control apparatus 112 and a heat exchanger 120 are arranged in alignment with each other in the longitudinal direction of a vehicle body. In the present embodiment, the control apparatus 112 is arranged posterior to the heat exchanger 120 so that only a part thereof overlaps the heat exchanger 120 in a front view. The present embodiment, too, allows traveling wind to appropriately hit both of the control apparatus 112 and the heat exchanger 120, thereby achieving the advantageous effects that are similar to those of the first embodiment.

The present embodiment is advantageous when, for example, the control apparatus 112 is relatively large in size and is difficult to be installed in alignment with the heat exchanger 120 in the up-and-down direction of the vehicle body or in the vehicle width direction. Alternatively, the present embodiment is also advantageous in increasing the size of the control apparatus 112 intentionally so as to enlarge the area that receives traveling wind.

FIG. 4B further shows a cross-sectional schematic view taken along the line X3-X3. In the present embodiment, the control apparatus 112 is arranged posterior to down frames 106, and the heat exchanger 120 is arranged anterior to the down frames 106. In this way, each of the control apparatus 112 and the heat exchanger 120 can be fixed appropriately with respect to the pair of left and right down frames 106.

Furthermore, it is sufficient to dispose the control apparatus 112 so that an upper end portion thereof is at least positioned above a lower end portion of the heat exchanger 120. In this way, the control apparatus 112 can receive traveling wind that has passed the heat exchanger 120, and can be cooled appropriately. More preferably, it is sufficient to dispose the control apparatus 112 so that the upper end portion thereof is positioned above an upper end portion of the heat exchanger 120. In this way, the control apparatus 112 can receive not only traveling wind that has passed the heat exchanger 120, but also, for example, traveling wind that has hit the heat exchanger 120 and veered toward an upper portion of the heat exchanger 120, and can be cooled more appropriately.

Furthermore, in the present embodiment also, it is sufficient for a lower end portion of the control apparatus 112 to be positioned above a lower end portion of a motor unit 111, similarly to the first embodiment. In this way, traveling wind that has hit the control apparatus 112 and veered toward a lower portion of the control apparatus 112 can hit a housing of the motor unit 111, which is below and posterior to the control apparatus 112, and consequently cool the inside thereof. In addition, in the present embodiment also, a plurality of fins 112f are installed on a front surface of the control apparatus 112 so as to extend in the up-and-down direction of the vehicle body; thus, traveling wind flows toward a lower portion of the vehicle body. Therefore, the motor unit 111 can be cooled more appropriately.

Although the above has described examples of several preferred modes, the present invention is not limited to these examples, and a part of each embodiment may be changed or combined without departing from the intent of the present invention. Furthermore, individual terms that have been described in the present specification are merely used for the purpose of explaining the present invention, and it goes without saying that the present invention is not limited to strict meanings of such terms and can also include their equivalents.

For example, a straddle-type vehicle refers to a type that a driver rides by straddling a vehicle body, and its concept also includes, in addition to a motorcycle (including a scooter-type vehicle), a three-wheeled vehicle (a vehicle having one front wheel and two rear wheels, or two front wheels and one rear wheel) and the like.

Summary of Embodiments

A first mode pertains to a straddle-type electric vehicle (e.g., 1), the straddle-type electric vehicle being a straddle-type electric vehicle including a main frame (e.g., 105) that is installed so as to extend in a longitudinal direction of a vehicle body, a pivot frame (e.g., 108) that is installed so as to extend downward from a rear portion of the main frame, and a swing arm (e.g., 109) which is supported by the pivot frame and by which a rear wheel (e.g., 102) is swingably supported, the straddle-type electric vehicle further including: a battery (e.g., 110) supported by the main frame; a motor unit (e.g., 111) configured to be coolable by circulation of a cooling medium; a control apparatus (e.g., 112) that controls the motor unit based on electric power of the battery; and a heat exchanger (e.g., 120) connected to the motor unit via a pipe (e.g., $P_1$) that forms a flow path for the cooling medium, wherein the control apparatus and the heat exchanger are arranged anterior to the battery in alignment with each other.

As traveling wind is generated during travel, traveling wind hits both of the control apparatus and the heat exchanger that are arranged anterior to the battery in alignment with each other. The control apparatus is cooled by receiving this traveling wind. Furthermore, the heat exchanger is connected to the motor unit via the pipe that serves as the flow path for the cooling medium, and this motor unit is cooled appropriately as the heat exchanger receives traveling wind. Therefore, according to the first mode, both of the motor unit and the control apparatus are cooled appropriately.

In a second mode, the control apparatus and the heat exchanger are arranged in alignment with each other such that a plane in which one of the control apparatus and the heat exchanger is not covered by the other in a front view is formed.

According to the second mode, each of the control apparatus and the heat exchanger includes a portion that directly receives traveling wind, and the cooling performance is improved in both the motor unit and the control apparatus.

In a third mode, the motor unit is fixed with respect to the pivot frame.

According to the third mode, the motor unit can be fixed at a position where it can appropriately transmit motive power to the wheel.

In a fourth mode, a plurality of heat dissipation fins (e.g., 1120) are provided on a front surface of the control apparatus, the plurality of heat dissipation fins being installed so as to extend in an up-and-down direction of the vehicle body in a front view.

According to the fourth mode, traveling wind that has hit the control apparatus can be appropriately guided downward.

In a fifth mode, the motor unit is provided with a pump unit (e.g., 1112) for circulating the cooling medium, the pump unit pressure-feeds the cooling medium that has cooled the motor unit to the heat exchanger, the heat exchanger and the control apparatus are connected by a second pipe (e.g., $P_2$) so that the cooling medium that has passed through the heat exchanger passes through the control apparatus, and the control apparatus and the motor unit are connected by a third pipe (e.g., $P_3$) so that the cooling medium that has passed through the control apparatus returns to the motor unit.

According to the fifth mode, as the control apparatus is cooled by traveling wind, the cooling medium sufficiently has a cooling function even after passing through the control apparatus, and this cooling medium can be appropriately used in cooling the motor unit.

In a sixth mode, the control apparatus is arranged below the heat exchanger in a front view.

According to the sixth mode, both of the control apparatus and the heat exchanger can be appropriately hit by traveling wind. Also, as down frames are installed so as to extend downward and rearward, at least a part of traveling wind that has passed the heat exchanger can thereafter pass a front surface and a rear surface of the control apparatus, and the control apparatus can be cooled more appropriately. Furthermore, in terms of design, the control apparatus is arranged relatively near the motor unit, and it is also possible to make a wire unit (e.g., a wire harness) that connects the control apparatus and the motor unit relatively short.

In a seventh mode, a pair of left and right down frames (e.g., 106) is further included that is installed below the main frame so as to extend toward a lower rear portion of the vehicle body, and the control apparatus and the heat exchanger are both fixed while straddling the pair of left and right down frames in a front view.

According to the seventh mode, each of the control apparatus and the heat exchanger can be firmly fixed.

In an eighth mode, a down frame (e.g., 106) and a pair of left and right shrouds (e.g., 131L and 131R) are further included, the down frame being installed below the main frame so as to extend toward a lower rear portion of the vehicle body, the pair of left and right shrouds being disposed on outer sides of the down frame in a vehicle width direction, and the pair of left and right shrouds is installed so as to extend in an up-and-down direction of the vehicle body in such a manner that each shroud overlaps at least both of the control apparatus and the heat exchanger in a horizontal direction of the vehicle body.

According to the eighth mode, the shrouds can be installed relatively easily, and the number of components can be reduced.

In a ninth mode, the pair of left and right shrouds is disposed on left and right sides of the control apparatus and the heat exchanger in a front view, and front edge portions of the pair of left and right shrouds are arranged anterior to the control apparatus and the heat exchanger so as to guide traveling wind to the control apparatus and the heat exchanger.

According to the ninth mode, both of the control apparatus and the heat exchanger can be hit by traveling wind more appropriately.

In a tenth mode, the pair of left and right shrouds is fixed in such a manner that a distance therebetween (e.g., L1) in the front edge portions is longer than a distance therebetween (e.g., L2) in rear edge portions.

According to the tenth mode, traveling wind can be guided appropriately toward the control apparatus and the heat exchanger.

In an eleventh mode, the control apparatus and the heat exchanger are arranged in alignment with each other in a vehicle width direction.

According to the eleventh mode, both of the control apparatus and the heat exchanger can be appropriately hit by traveling wind. Also, the mode of arrangement of the wire unit connected to the control apparatus and the mode of arrangement of the pipe connected to the heat exchanger can be individually determined without making a vehicle body configuration excessively complex; this is advantageous in terms of design. Furthermore, as the control apparatus and the heat exchanger generally differ from each other in weight, it is also possible to balance the center of mass of the vehicle body by determining the positions in which they are arranged in consideration of their weights.

In a twelfth mode, a pair of left and right down frames (e.g., 106) is further included that is installed below the main frame so as to extend toward a lower rear portion of the vehicle body, the control apparatus is fixed with respect to one of the pair of left and right down frames, and the heat exchanger is fixed with respect to the other of the pair of left and right down frames.

According to the twelfth mode, each of the control apparatus and the heat exchanger can be fixed appropriately.

In a thirteenth mode, in a front view, the motor unit is disposed while being displaced from a center of the vehicle body toward one side, and the control apparatus is fixed with respect to one of the pair of left and right down frames on the one side.

According to the thirteenth mode, the wire unit that connects the control apparatus and the motor unit can be made relatively short.

In a fourteenth mode, the control apparatus is arranged posterior to the heat exchanger so that a part thereof overlaps the heat exchanger in a front view.

According to the fourteenth mode, both of the control apparatus and the heat exchanger can be appropriately hit by traveling wind, and the control apparatus can be cooled using traveling wind that can have a cooling function even after passing the heat exchanger.

In a fifteenth mode, an upper end portion of the control apparatus is positioned above a lower end portion of the heat exchanger.

According to the fifteenth mode, the control apparatus can receive traveling wind that can have a cooling function even after passing the heat exchanger, and can be cooled appropriately.

In a sixteenth mode, a lower end portion of the control apparatus is positioned above a lower end portion of the motor unit.

According to the sixteenth mode, traveling wind that has hit the control apparatus thereafter hits the motor unit, which is below and posterior to the control apparatus; this can cool a housing of the motor unit and consequently the inside of the motor unit.

The present invention is not limited to the above embodiments and various changes and modifications can be made within the spirit and scope of the present invention. Therefore, to apprise the public of the scope of the present invention, the following claims are made.

The invention claimed is:

1. A straddle-type electric vehicle including a main frame that is installed so as to extend in a longitudinal direction of a vehicle body, a pivot frame that is installed so as to extend downward from a rear portion of the main frame, and a swing arm which is supported by the pivot frame and by which a rear wheel is swingably supported, the straddle-type electric vehicle further comprising:
    a battery supported by the main frame;
    a motor unit configured to be coolable by circulation of a cooling medium;
    a control apparatus that controls the motor unit based on electric power of the battery; and
    a heat exchanger connected to the motor unit via a pipe that forms a flow path for the cooling medium,
    wherein the control apparatus and the heat exchanger are exposed and arranged anterior to the battery in alignment with each other, such that a traveling wind hits front surfaces of both the control apparatus and the heat exchanger.

2. The straddle-type electric vehicle according to claim 1, wherein
    a plurality of heat dissipation fins are installed on a front surface of the control apparatus, and exposed in a front view to be hit by the traveling wind.

3. The straddle-type electric vehicle according to claim 1, wherein
    the motor unit is fixed with respect to the pivot frame.

4. The straddle-type electric vehicle according to claim 1, wherein
    a plurality of heat dissipation fins are provided on a front surface of the control apparatus, the plurality of heat dissipation fins being installed so as to extend in an up-and-down direction of the vehicle body in a front view.

5. The straddle-type electric vehicle according to claim 1, wherein
    the motor unit is provided with a pump unit for circulating the cooling medium,
    the pump unit pressure-feeds the cooling medium that has cooled the motor unit to the heat exchanger,
    the heat exchanger and the control apparatus are connected by a second pipe so that the cooling medium that has passed through the heat exchanger passes through the control apparatus, and
    the control apparatus and the motor unit are connected by a third pipe so that the cooling medium that has passed through the control apparatus returns to the motor unit.

6. The straddle-type electric vehicle according to claim 1, wherein
    the control apparatus is arranged below the heat exchanger in a front view.

7. The straddle-type electric vehicle according to claim 6, further comprising
    a pair of left and right down frames that is installed below the main frame so as to extend toward a lower rear portion of the vehicle body,
    wherein the control apparatus and the heat exchanger are both fixed while straddling the pair of left and right down frames in a front view.

8. The straddle-type electric vehicle according to claim 6, further comprising:
   a down frame that is installed below the main frame so as to extend toward a lower rear portion of the vehicle body; and
   a pair of left and right shrouds that is disposed on outer sides of the down frame in a vehicle width direction,
   wherein the pair of left and right shrouds is installed so as to extend in an up-and-down direction of the vehicle body in such a manner that each shroud overlaps at least both of the control apparatus and the heat exchanger in a horizontal direction of the vehicle body.

9. The straddle-type electric vehicle according to claim 8, wherein
   the pair of left and right shrouds is disposed on left and right sides of the control apparatus and the heat exchanger in a front view, and front edge portions of the pair of left and right shrouds are arranged anterior to the control apparatus and the heat exchanger so as to guide traveling wind to the control apparatus and the heat exchanger.

10. The straddle-type electric vehicle according to claim 9, wherein
    the pair of left and right shrouds is fixed in such a manner that a distance therebetween in the front edge portions is longer than a distance therebetween in rear edge portions.

11. The straddle-type electric vehicle according to claim 1, wherein
    the control apparatus and the heat exchanger are arranged in alignment with each other in a vehicle width direction.

12. The straddle-type electric vehicle according to claim 11, further comprising
    a pair of left and right down frames that is installed below the main frame so as to extend toward a lower rear portion of the vehicle body,
    wherein the control apparatus is fixed with respect to one of the pair of left and right down frames, and the heat exchanger is fixed with respect to the other of the pair of left and right down frames.

13. The straddle-type electric vehicle according to claim 12, wherein
    in a front view,
    the motor unit is disposed while being displaced from a center of the vehicle body toward one side, and
    the control apparatus is fixed with respect to one of the pair of left and right down frames on the one side.

14. The straddle-type electric vehicle according to claim 1, wherein
    the control apparatus is arranged posterior to the heat exchanger so that a part thereof overlaps the heat exchanger in a front view.

15. The straddle-type electric vehicle according to claim 14, wherein
    an upper end portion of the control apparatus is positioned above a lower end portion of the heat exchanger.

16. The straddle-type electric vehicle according to claim 14, wherein
    a lower end portion of the control apparatus is positioned above a lower end portion of the motor unit.

* * * * *